US012799286B2

(12) United States Patent
Kaneko et al.

(10) Patent No.: US 12,799,286 B2
(45) Date of Patent: Nov. 17, 2026

(54) HEAT-SHRINKABLE POLYESTER FILM

(71) Applicants: C.I. TAKIRON Corporation, Osaka (JP); Bonset America Corporation, Browns Summit, NC (US); Bonset Latin America S.A., Barros Blancos Canelones (UY)

(72) Inventors: Takuma Kaneko, Osaka (JP); Yuichiro Kanzaka, Osaka (JP); Shuuta Yuge, Osaka (JP); Tatsuya Irifune, Osaka (JP); Masanao Miyoshi, Osaka (JP)

(73) Assignees: C.I. Takiron Corporation, Osaka (JP); Bonset America Corporation, Browns Summit, NC (US)

( * ) Notice: Subject to any disclaimer, the term of this patent is extended or adjusted under 35 U.S.C. 154(b) by 713 days.

(21) Appl. No.: 18/042,798

(22) PCT Filed: Sep. 18, 2020

(86) PCT No.: PCT/JP2020/035521

§ 371 (c)(1),
(2) Date: Feb. 24, 2023

(87) PCT Pub. No.: WO2022/059184

PCT Pub. Date: Mar. 24, 2022

(65) Prior Publication Data

US 2023/0303785 A1 Sep. 28, 2023

(51) Int. Cl.
*C08J 5/18* (2006.01)

(52) U.S. Cl.
CPC ............. *C08J 5/18* (2013.01); *C08J 2367/02* (2013.01)

(58) Field of Classification Search
None
See application file for complete search history.

(56) References Cited

U.S. PATENT DOCUMENTS

| | | | | |
|---|---|---|---|---|
| 5,589,126 | A | 12/1996 | Shih et al. | |
| 2001/0051238 | A1 | 12/2001 | Ito et al. | |
| 2011/0008607 | A1* | 1/2011 | Haruta | B29C 55/14 428/500 |
| 2011/0224369 | A1* | 9/2011 | Kim | C09D 5/26 528/308.1 |
| 2015/0014202 | A1 | 1/2015 | Huruta et al. | |
| 2018/0229422 | A1 | 8/2018 | Inoue et al. | |

(Continued)

FOREIGN PATENT DOCUMENTS

| | | | |
|---|---|---|---|
| CN | 102190867 | A | 9/2011 |
| CN | 107922642 | A | 4/2018 |

(Continued)

*Primary Examiner* — Ha S Nguyen
(74) *Attorney, Agent, or Firm* — Renner, Kenner; Arthur M. Reginelli

(57) ABSTRACT

A heat-shrinkable polyester film having excellent wrinkle resistance characteristics is provided.

A heat-shrinkable polyester film satisfying the following configurations (a) to (c):

(a) a thermal shrinkage ratio in the TD direction obtainable under the conditions of 10 seconds in hot water at 90 °C as designated as A2, is a value of 53% or greater;
(b) a maximum shrinkage stress in the TD direction at 90 °C as designated as B is a value of 2 to 10 MPa; and
(c) a value represented by B/A2 is a value of 0.08 to 0.15 MPa/%.

9 Claims, 8 Drawing Sheets

(56) References Cited

U.S. PATENT DOCUMENTS

| | | | |
|---|---|---|---|
| 2021/0214583 | A1 | 7/2021 | Kaneko et al. |
| 2021/0246301 | A1 | 8/2021 | Ishimaru et al. |
| 2021/0317299 | A1 | 10/2021 | Inoue et al. |

FOREIGN PATENT DOCUMENTS

| | | | | | |
|---|---|---|---|---|---|
| EP | 2058357 | B1 | | 11/2011 | |
| JP | 2002-011790 | A | | 1/2002 | |
| JP | 2009-226934 | A | | 10/2009 | |
| JP | 2009-237561 | A | | 10/2009 | |
| JP | 201236273 | A | | 2/2012 | |
| JP | 2012036272 | A | * | 2/2012 | ................ C08J 5/18 |
| JP | 2019178194 | A | * | 10/2019 | ................ C08J 5/18 |
| KR | 1020140096176 | A | | 8/2014 | |
| TW | 202017966 | A | | 5/2020 | |
| WO | 2019230843 | A1 | | 5/2019 | |

* cited by examiner

HEAT-SHRINKABLE POLYESTER FILM

TECHNICAL FIELD

The present invention relates to a heat-shrinkable polyester film (sometimes called as a polyester-based shrink film etc.).

More specifically, the invention relates to a heat-shrinkable polyester film having excellent wrinkle resistance characteristics for PET bottles and the like.

BACKGROUND ART

Shrink films are conventionally widely used as base films for labels of PET bottles and the like. Particularly, heat-shrinkable polyester films are excellent in terms of strength, transparency, and the like, and accordingly, it is the situation in which the market share of heat-shrinkable polyester films as base films for labels is increasing.

Heat-shrinkable polyester films have such excellent characteristics; however, since heat-shrinkable polyester films give rapid thermal responses when heated, the films shrink unevenly, and there is seen a problem that wrinkles are likely to be generated.

Thus, it has been proposed to the effect that generation of wrinkles is suppressed by controlling the thermal shrinkage ratio or the thickness distribution at a plurality of predetermined temperatures (see, for example, Patent Document 1).

More specifically, there is a heat-shrinkable thermoplastic resin film characterized in that the hot water shrinkage ratio of the film in the main shrinkage direction is 5% to 50% after a treatment at a temperature of 70 °C for 5 seconds and is 65% or greater after a treatment at 85 °C for 5 seconds, and the hot water shrinkage ratio in a direction orthogonally intersecting the main shrinkage direction is 10% or less after a treatment at 85 °C for 5 seconds.

Further, the heat-shrinkable thermoplastic resin film characterized in that the distribution of thickness is 6% or less.

CITATION LIST

Patent Document

Patent Document 1: JP 2002-011790 A (claims and the like)

SUMMARY OF THE INVENTION

Problem to be Solved by the Invention

However, with regard to the heat-shrinkable thermoplastic resin film described in Patent Document 1, the thermal shrinkage ratios at predetermined temperatures in predetermined shrinkage directions are limited to values within predetermined ranges; however, the maximum shrinkage stress or the ratio between the maximum shrinkage stress and the thermal shrinkage ratio were not taken into consideration. Therefore, there has been a problem that when this film is applied to various PET bottles and the like, the occurrence of fine wrinkles in a thermal shrinkage process of the film may not be suppressed.

Particularly, in the case of a PET bottle having a complicated shape, in which the bottle diameter of the body part is not even while the horizontal cross-section shape of the body part is not a circular shape depending on the portion, shrinkage is likely to be non-uniform, and therefore, suppression of the generation of fine wrinkles was not achievable.

Thus, the inventors of the present invention found that when a predetermined thermal shrinkage ratio and a predetermined maximum shrinkage stress are limited to values within predetermined ranges, respectively, and at the same time, the ratio and the like between these maximum shrinkage stress and thermal shrinkage ratio are limited to values within predetermined ranges, a shrink film capable of suppressing even the generation of fine wrinkles when applied to various PET bottles and the like is obtained, thus completing the present invention.

That is, it is an object of the present invention to provide a heat-shrinkable polyester film that exhibits excellent wrinkle resistance characteristics even when applied to various PET bottles and the like.

Means for Solving Problem

According to the present invention, there is provided a heat-shrinkable polyester film derived from a polyester resin, the heat-shrinkable polyester film satisfying the following configurations (a) to (c), and the above-described problems can be solved.

(a) When a main shrinkage direction is designated as TD direction (hereinafter, the same), and a thermal shrinkage ratio in the TD direction obtainable in a case where the heat-shrinkable polyester film is caused to shrink under the conditions of 10 seconds in hot water at 90 °C is designated as A2 (%), A2 is set to a value of 53% or greater.

(b) A maximum shrinkage stress in the TD direction at a shrinkage temperature of 90 °C is designated as B (MPa), and the B is set to a value within the range of 2 to 10 (MPa).

(c) From the B and the A2, a numerical value represented by B/A2 is set to a value within the range of 0.08 to 0.15 MPa/%.

That is, it is because when the configuration (a) is satisfied, in a heat-shrinkable polyester film at the time of thermal shrinkage, a satisfactory thermal shrinkage ratio can be obtained, and in addition, a satisfactory maximum shrinkage stress can also be obtained.

Furthermore, when the configuration (b) is satisfied, a heat-shrinkable polyester film in which the maximum shrinkage stress can be controlled to a value within a predetermined range, and wrinkles that may be generated due to excess or deficiency of the maximum shrinkage stress can be suppressed, can be obtained.

In addition, when the configuration (c) is satisfied, even in a case where the values of the thermal shrinkage ratio of the configuration (a) and the maximum shrinkage stress of the configuration (b) vary to some extent, contributors of predetermined influential factors are reduced so that in the heat-shrinkable polyester film at the time of thermal shrinkage, non-uniform shrinkage caused by a rapid thermal response can be suppressed, and as a result, the generation of fine wrinkles can also be suppressed.

Accordingly, a shrink film having excellent wrinkle resistance characteristics can be provided by limiting these thermal shrinkage ratio A2, maximum shrinkage stress B, and B/A2 to values within predetermined ranges.

Incidentally, with regard to the wrinkle resistance characteristics, for example, in Evaluation 9 of Example 1, a case in which predetermined wrinkles were not generated upon observation by visual inspection, in three or more out of five cylindrical-shaped labels under predetermined conditions, which had been produced from the heat-shrinkable polyester film of the present invention, is considered satisfactory.

Furthermore, on the occasion of configuring the heat-shrinkable polyester film of the present invention, it is preferable that the following configuration (d) is further satisfied.

(d) A thickness of the heat-shrinkable polyester film before shrinkage is designated as t (μm), and from the B and the t, a numerical value represented by B/t is set to a value within the range of 0.05 to 0.4 MPa/μm.

By specifically limiting the numerical value represented by B/t to a value within a predetermined range in this manner, it is easy to control the numerical value represented by B/A2 to a value within a predetermined range.

Therefore, the wrinkle resistance characteristics can be even further improved.

Furthermore, on the occasion of configuring the heat-shrinkable polyester film of the present invention, it is preferable that the thickness t of the heat-shrinkable polyester film before shrinkage is set to a value within the range of 15 to 45 μm.

By specifically limiting the thickness of the heat-shrinkable polyester film before shrinkage to a value within a predetermined range in this manner, it is easy to set the thermal shrinkage ratio A2, the maximum shrinkage stress B, the numerical values represented by B/A2 and B/t, and the like to values within predetermined ranges, respectively, and to control the values more easily.

Furthermore, on the occasion of configuring the heat-shrinkable polyester film of the present invention, it is preferable that a thermal shrinkage ratio in the TD direction obtainable when the heat-shrinkable polyester film is caused to shrink in hot water at 80° C. under the conditions of 10 seconds is designated as A1 (%), and A1 is set to a value within the range of 40% to 70%.

By specifically limiting the thermal shrinkage ratio A1 to a value within a predetermined range in this manner, it is easy to set the thermal shrinkage ratio A2 to a value within a predetermined range and to control the value more easily.

Furthermore, on the occasion of configuring the heat-shrinkable polyester film of the present invention, it is preferable that a stretch ratio in an MD direction of the heat-shrinkable polyester film before shrinkage is set to a value within the range of 100% to 200%.

By specifically limiting the stretch ratio in the MD direction of the heat-shrinkable polyester film before shrinkage to a value within a predetermined range in this manner, and by specifically limiting the numerical values represented by A1, A2, B, B/A2, and B/t, thermal shrinkage ratios A'1 and A'2 that will be described below, and the like to values within predetermined ranges, respectively, the generation of fine wrinkles can also be suppressed.

Furthermore, on the occasion of configuring the heat-shrinkable polyester film of the present invention, it is preferable that a stretch ratio in the TD direction of the heat-shrinkable polyester film before shrinkage is set to a value within the range of 300% to 600%.

By specifically limiting the stretch ratios in the MD direction as well as in the TD direction of the heat-shrinkable polyester film before shrinkage to values within predetermined ranges in this manner, and specifically limiting the numerical values represented by A1, A2, B, B/A2, and B/t, the thermal shrinkage ratios A'1 and A'2 that will be described below, and the like to values within predetermined ranges, respectively, the generation of fine wrinkles can be suppressed.

Furthermore, on the occasion of configuring the heat-shrinkable polyester film of the present invention, it is preferable that a haze value of the film before shrinkage as measured according to JIS K7105 is set to a value of 5% or less.

By specifically limiting the haze value to a value within a predetermined range in this manner, transparency of the heat-shrinkable polyester film can also be easily controlled quantitatively, and since transparency is satisfactory, general-purpose usability can be further increased.

Furthermore, on the occasion of configuring the heat-shrinkable polyester film of the present invention, it is preferable that a content of a non-crystalline polyester resin is set to a value within the range of 90% to 100% by weight of a total quantity of resins.

By specifically limiting the content of the non-crystalline polyester resin in this manner, the thermal shrinkage ratio and maximum shrinkage stress in the vicinity of the shrinkage temperature (for example, 80 °C to 90 °C; hereinafter, the same) can be adjusted more easily to desired ranges, and at the same time, the haze value and the like are easily controlled quantitatively.

Incidentally, the balance of the non-crystalline polyester resin in the total quantity of resins is a value contributed by a crystalline polyester resin and a resin other than a polyester resin.

MODE(S) FOR CARRYING OUT THE INVENTION

First Embodiment

A first embodiment is a heat-shrinkable polyester film derived from a polyester resin as illustrated in FIG. 1 and is a heat-shrinkable polyester film that satisfies the following configurations (a) to (c):

(a) when a main shrinkage direction is designated as TD direction, and a shrinkage ratio in the TD direction in a case where the heat-shrinkable polyester film is caused to shrink under the conditions of 10 seconds in hot water at 90 °C is designated as A2, A2 is set to a value of 53% or greater;

(b) a maximum shrinkage stress in the TD direction at a shrinkage temperature of 90 °C is designated as B, and B is set to a value within the range of 2 to 10 MPa; and (c) from B and A2, a numerical value represented by B/A2 is set to a value within the range of 0.08 to 0.15 MPa/%.

Figure 1A:
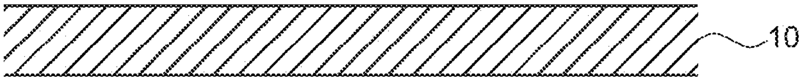
FIGS. 1A to 1C are each a diagram for describing a form of a heat-shrinkable polyester film.

Hereinafter, various parameters and the like will be specifically described with appropriate reference to FIGS. 1A to 1C, separately for the configurations of the heat-shrinkable polyester film of the first embodiment.

1. Polyester Resin

Basically, the type of the polyester resin does not matter; however, usually, the polyester resin is preferably a polyester resin formed from a diol and a dicarboxylic acid; a polyester resin formed from a diol and a hydroxycarboxylic acid; a polyester resin formed from a diol, a dicarboxylic acid, and a hydroxycarboxylic acid; or a mixture of these polyester resins.

Here, the diol as a compound component of the polyester resin may be at least one of aliphatic diols such as ethylene glycol, diethylene glycol, propanediol, butanediol, neopentyl glycol, and hexanediol; alicyclic diols such as 1,4-hexanedimethanol; aromatic diols; and the like.

Then, among these, ethylene glycol, diethylene glycol, and 1,4-hexanedimethanol are particularly preferred.

Furthermore, the dicarboxylic acid as a compound component of the same polyester resin may be at least one of aliphatic dicarboxylic acids such as adipic acid, sebacic acid, and azelaic acid; aromatic dicarboxylic acids such as terephthalic acid, naphthalenedicarboxylic acid, and isophthalic acid; alicyclic dicarboxylic acids such as 1,4-cyclohexanedicarboxylic acid; ester-forming derivatives of these; and the like.

Among these, terephthalic acid is particularly preferred.

Furthermore, the hydroxycarboxylic acid as a compound component of the same polyester resin may be at least one of lactic acid, hydroxybutyric acid, polycaprolactone, and the like.

Furthermore, as a non-crystalline polyester resin, for example, a non-crystalline polyester resin formed from a dicarboxylic acid composed of at least 80 mol % of terephthalic acid, and a diol composed of 50 mol % to 80 mol % of ethylene glycol and 20 mol % to 50 mol % of one or more diols selected from 1,4-cyclohexanedimethanol, neopentyl glycol, and diethylene glycol, can be suitably used. In order to change the properties of the film as necessary, other dicarboxylic acids and diols or hydroxycarboxylic acids may also be used. Furthermore, each of the components may be used singly or as a mixture.

On the other hand, examples of a crystalline polyester resin include polyethylene terephthalate, polyethylene naphthalate, polybutylene terephthalate, polybutylene naphthalate, and polypropylene terephthalate, and each of these may be used singly or as a mixture.

Furthermore, in a case where the polyester resin is a mixture of a non-crystalline polyester resin and a crystalline polyester resin, in order to obtain satisfactory heat resistance, a satisfactory shrinkage ratio, and the like, it is preferable that the blending amount of the non-crystalline polyester resin is set to a value within the range of 90% to 100% by weight, and more preferably to a value within the range of 91% to 100% by weight, with respect to the total quantity of the resins constituting the heat-shrinkable polyester film.

2. Configuration (a)

Configuration (a) is a necessary configuration requirement to the effect that with regard to the heat-shrinkable polyester film of the first embodiment, the main shrinkage direction is designated as TD direction, the thermal shrinkage ratio in the TD direction in a case where the heat-shrinkable polyester film is caused to shrink under the conditions of 10 seconds in hot water at 90 °C is designated as A2, and this thermal shrinkage ratio A2 is set to a value of 53% or greater.

The reason for this is that when such 90 °C thermal shrinkage ratio A2 is specifically limited to be equal to or greater than a predetermined value, a satisfactory thermal shrinkage ratio is obtained, and furthermore, the maximum shrinkage stress is also obtained, for the heat-shrinkable polyester film at the time of thermal shrinkage.

More specifically, it is because when the 90 °C thermal shrinkage ratio A2 of the film has a value of below 53%, the thermal shrinkage ratio is insufficient, and for a PET bottle having a complicated shape, the film becomes incapable of following the peripheral shape of that bottle so that generation of wrinkles may not be suppressed.

Therefore, as the configuration (a), it is more preferable to set the lower limit of the 90 °C thermal shrinkage ratio A2 to a value of 56% or greater, and even more preferably to a value of 59% or greater.

On the other hand, in a case where the value of the above-mentioned 90 °C thermal shrinkage ratio A2 becomes excessively large, when the film is caused to thermally shrink, the film shrinks non-uniformly due to a rapid thermal response, and wrinkles may be easily generated.

Therefore, as the configuration (a), it is preferable to set the upper limit of the 90 °C thermal shrinkage ratio A2 to a value of 85% or less, and more preferably to a value of 80% or less.

Incidentally, the thermal shrinkage ratio for the shrink film of the first embodiment is defined by the following formula:

$$\text{Shrinkage ratio }(\%)=(L_0-L_1)/L_0\times 100$$

$L_0$: Dimension of sample before heat treatment (longitudinal direction or width direction)

$L_1$: Dimension of sample after heat treatment (same direction as $L_0$)

3. Configuration (b)

Configuration (b) is a necessary configuration requirement to the effect that a maximum shrinkage stress at a shrinkage temperature of 90 °C in the TD direction of the heat-shrinkable polyester film of the first embodiment is designated as B, and this B is set to a value within the range of 2 to 10 MPa.

The reason for this is that by specifically limiting B to a value within a predetermined range in this manner, wrinkles that may be generated as a result of excess or deficiency of the maximum shrinkage stress can be suppressed.

More specifically, it is because when the maximum shrinkage stress B has a value of below 2 MPa, the maximum shrinkage stress may become insufficient, excess wrinkles that might be generated in the early stage of shrinkage onto the PET bottle may not be eliminated in the shrinkage process, and the wrinkle resistance characteristics may be deteriorated.

Furthermore, it is because when the maximum shrinkage stress B has a value of 10 MPa or greater, the maximum shrinkage stress may become excessive, and deformation of the bottle may occur at the time of shrinkage onto the PET bottle.

Therefore, as the configuration (b), it is more preferable to set the maximum shrinkage stress B to a value within the range of 3 to 9 MPa, and even more preferably to a value within the range of 4 to 8 MPa.

Here, referring to FIG. 2, the relationship between the thermal shrinkage ratio A2 of the heat-shrinkable polyester film obtainable under predetermined heating conditions (hot water at 90 °C, for 10 seconds) and the maximum shrinkage stress B under predetermined heating conditions (hot air at 90 °C, for 30 seconds or longer), will be described.

Figure 2:
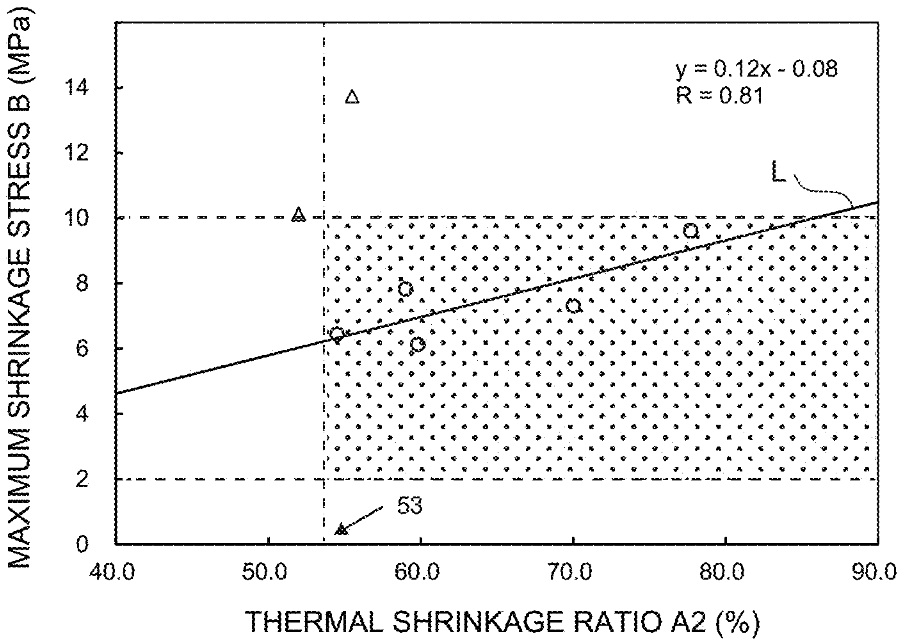
FIG. 2 is a diagram for describing the relationship between a shrinkage ratio (A2) of the heat-shrinkable polyester film under predetermined heating conditions (hot water at 90 °C, for 10 seconds) and a maximum shrinkage stress (B) under predetermined heating conditions (hot air at 90 °C, for 30 seconds or longer).

That is, with regard to the measurement data shown in such FIG. 2, it is understood that when the configuration (a) and the configuration (b) are satisfied, there is an excellent correlation (coefficient of correlation (R) is 0.81) in the relationship between the thermal shrinkage ratio A2 and the maximum shrinkage stress B. Therefore, as intended by the present application, the maximum shrinkage stress B can be controlled to a value within a predetermined range by limiting the thermal shrinkage ratio A2 to a value within a predetermined range.

4. Configuration (c)

Configuration (c) is a necessary configuration requirement to the effect that from the maximum shrinkage stress B and the thermal shrinkage ratio A2, a numerical value represented by B/A2 is set to a value within the range of 0.08 to 0.15 MPa/%.

The reason for this is that by specifically limiting B/A2 to a value within a predetermined range in this manner, even in a case where the values of the configuration (a) and the configuration (b) vary to some extent, contributors of predetermined influential factors are reduced so that in the heat-shrinkable polyester film at the time of thermal shrinkage, non-uniform shrinkage caused by a rapid thermal response can be suppressed, and as a result, the generation of fine wrinkles can also be suppressed.

More specifically, it is because when the numerical value represented by B/A2 is below 0.08 MPa/% or above 0.15 MPa/%, in the heat-shrinkable polyester film at the time of thermal shrinkage, non-uniform shrinkage caused by a rapid thermal response may not be suppressed, and the generation of fine wrinkles may not be suppressed.

Therefore, as the configuration (c), it is more preferable to set the numerical value represented by B/A2 to a value within the range of 0.09 to 0.14 MPa/%, and even more preferably to a value within the range of 0.10 to 0.13 MPa/%.

Figure 3:
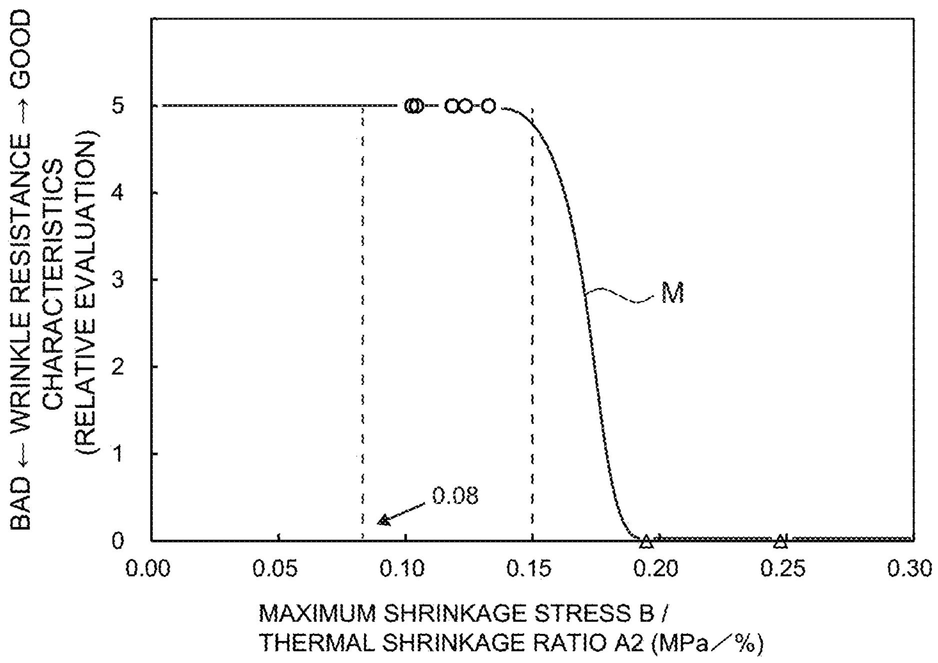
FIG. 3 is a diagram for describing the relationship between a ratio of the maximum shrinkage stress (B) of the heat-shrinkable polyester film/the shrinkage ratio (A2) and an evaluation of wrinkle resistance characteristics.

Next, the relationship between the numerical value represented by B/A2 and an evaluation of the wrinkle resistance characteristics will be more specifically shown in FIG. 3.

That is, a characteristic curve M is shown by plotting the value of B/A2 (MPa/%) for the heat-shrinkable polyester film on the axis of abscissa of FIG. 3 and taking the evaluation (relative value) of the wrinkle resistance characteristics on the axis of ordinate. The evaluation (relative value) of the wrinkle resistance characteristics on the axis of ordinate is obtained by quantifying ⊙ as 5, ◯ as 3, Δ as 1, and × as 0.

From such a characteristic curve M, when the numerical value represented by B/A2 is a value within the range of 0.08 to 0.15 MPa/%, it is understood that the evaluation (relative value) of the wrinkle resistance characteristics is 3 or greater, and a satisfactory evaluation (relative value) of the wrinkle resistance characteristics is obtained.

In contrast, it is understood that when the numerical value represented by B/A2 is above 0.15 MPa/%, the evaluation (relative value) of the wrinkle resistance characteristics is rapidly decreased, and sufficient wrinkle resistance characteristics are not exhibited.

5. Optional Configuration Requirement (1) Configuration (d)

Configuration (d) is a configuration requirement to the effect that a numerical value represented by B/t, which is a ratio of the maximum shrinkage stress B in the heat-shrinkable polyester film of the first embodiment and a thickness t (μm) thereof, is set to a value within the range of 0.05 to 0.4 MPa/μm.

The reason for this is that by specifically limiting B/t to a value within a predetermined range in this manner, the numerical value represented by B/A2 is likely to be controlled more easily to a value within a predetermined range, and contributors of predetermined influential factors are reduced so that in the heat-shrinkable polyester film at the time of thermal shrinkage, non-uniform shrinkage caused by a rapid thermal response can be suppressed, and as a result, the generation of fine wrinkles can also be suppressed.

More specifically, it is because when the numerical value represented by B/t is below 0.05 MPa/μm or above 0.4 MPa/μm, in the heat-shrinkable polyester film at the time of thermal shrinkage, non-uniform shrinkage caused by a rapid thermal response may not be suppressed, and the generation of fine wrinkles may not be suppressed.

Therefore, as the configuration (d), it is more preferable that the numerical value represented by B/t is set to a value within the range of 0.06 to 0.35 MPa/μm, and even more preferably to a value within the range of 0.07 to 0.30 MPa/μm.

Figure 4:
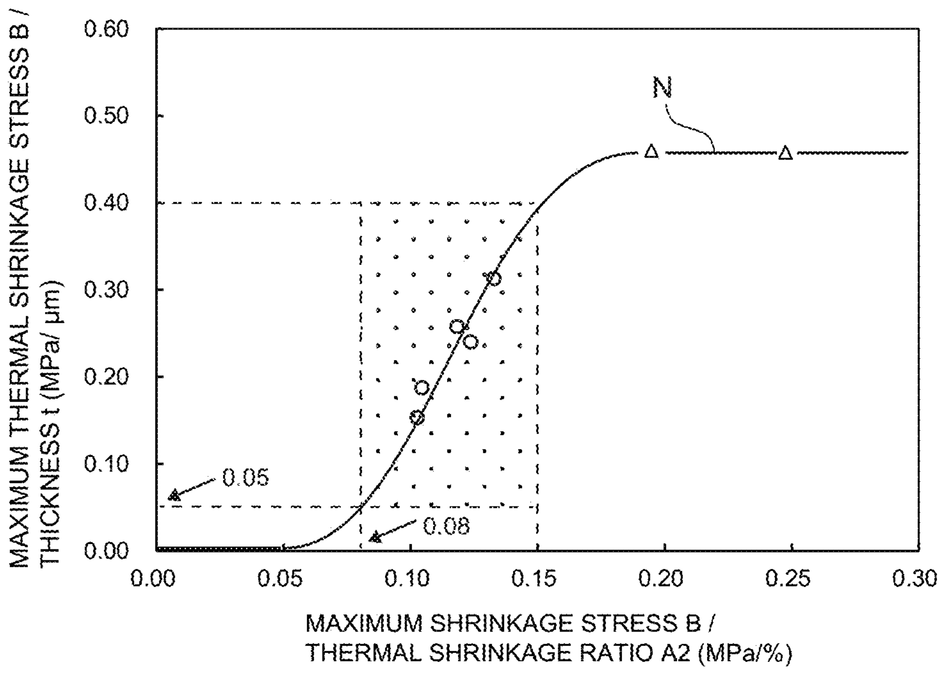
FIG. 4 is a diagram for describing the relationship between the ratio of maximum shrinkage stress (B)/shrinkage ratio (A2) of the heat-shrinkable polyester film and the ratio of maximum shrinkage stress (B)/thickness (t).

Next, the relationship between the numerical value represented by B/A2 and the numerical value represented by B/t will be shown in FIG. 4.

That is, a characteristic curve N is shown by plotting the numerical value represented by B/A2 (MPa/%) for the heat-shrinkable polyester film on the axis of abscissa of FIG. 4 and plotting the value of B/t (MPa/μm) on the axis of ordinate.

From such a characteristic curve N, it is understood that by setting the numerical value represented by B/A2 to a value within the range of 0.08 to 0.15 MPa/% and setting the numerical value represented by B/t to a value within the range of 0.05 to 0.40 MPa/μm, a shaded region is configured. Then, within this region, the evaluation (relative value) of the wrinkle resistance characteristics is 3 or greater, and satisfactory wrinkle resistance characteristics can be obtained.

Figure 5:
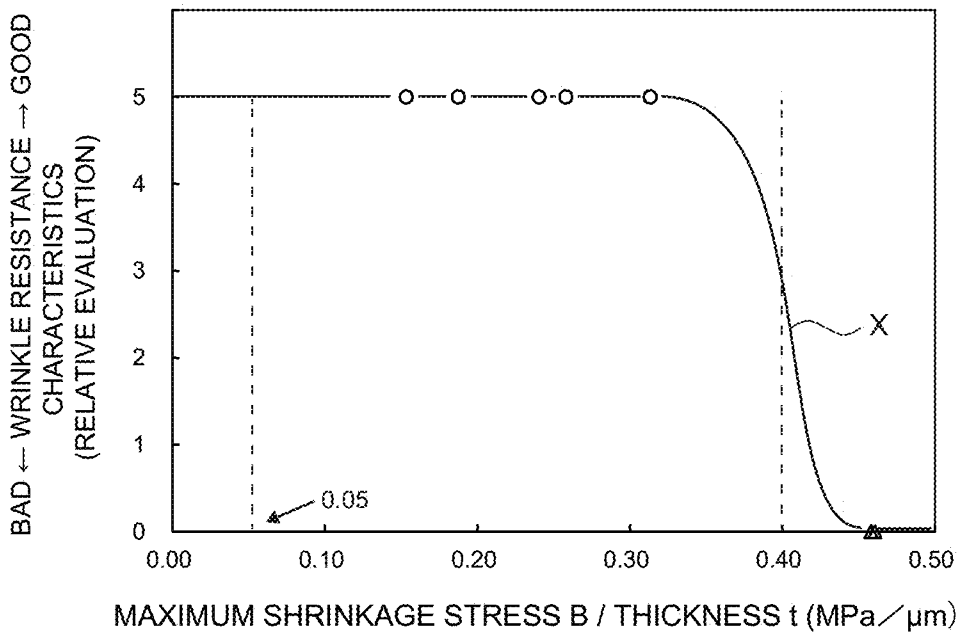
FIG. 5 is a diagram for describing the relationship between the ratio of maximum shrinkage stress (B)/thickness (t) of the heat-shrinkable polyester film and the evaluation of wrinkle resistance characteristics.

Next, the relationship between the numerical value represented by B/t and the evaluation of the wrinkle resistance characteristics is shown in FIG. 5.

That is, a characteristic curve X is shown by plotting the value of B/t (MPa/μm) for the heat-shrinkable polyester film on the axis of abscissa of FIG. 5 and plotting the evaluation (relative value) of the wrinkle resistance characteristics similarly to FIG. 3 on the axis of ordinate. The evaluation (relative value) of the wrinkle resistance characteristics on the axis of ordinate is obtained by quantifying ⊙ as 5, ○ as 3, Δ as 1, and × as 0.

From such a characteristic curve X, it is understood that when the numerical value represented by B/t is a value within the range of 0.05 to 0.40 MPa/μm, the evaluation (relative value) of the wrinkle resistance characteristics is 3 or greater, and a satisfactory evaluation (relative value) of the wrinkle resistance characteristics is obtained.

In contrast, it is understood that when the numerical value represented by B/t is above 0.40 MPa/μm, the evaluation (relative value) of the wrinkle resistance characteristics is below 3, and sufficient wrinkle resistance characteristics are not exhibited.

Next, FIG. 6 and FIG. 7 will be explained.

Figure 6A:
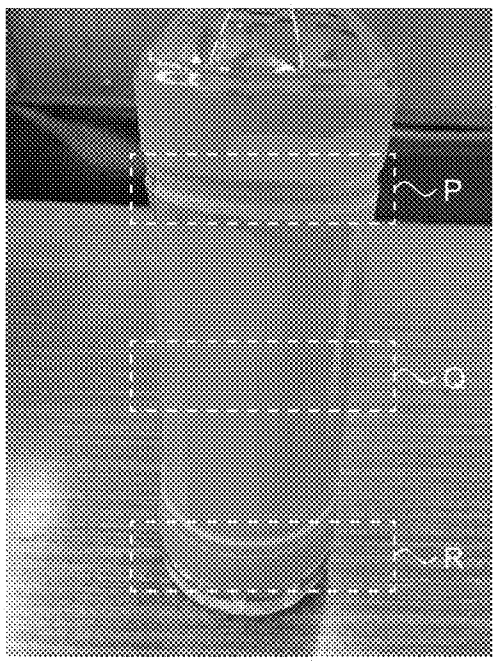
FIG. 6A is a diagram (photograph) showing the state of external appearance of a cylindrical-shaped label in a case in which wrinkles are not generated, which corresponds to Example 1.
Figure 6B:
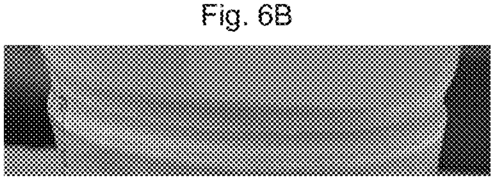
FIGS. 6B to 6D are enlarged views of regions P, Q, and R, respectively, of the external appearance shown in FIG. 6A.
Figure 6C:
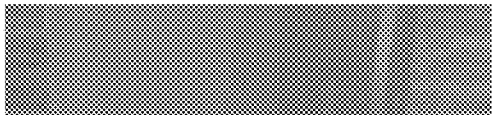
Figure 6D:
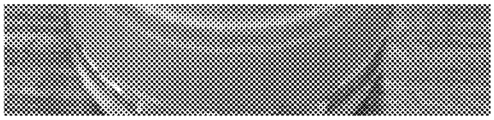

That is, FIG. 6 is a photograph of the external appearance of a cylindrical-shaped label corresponding to Example 1 in a case where wrinkles are not generated, and FIG. 6A shows the entire body part of a PET bottle covered with this cylindrical-shaped label. FIGS. 6B to 6D are enlarged views of the upper part (region P), the middle part (region Q), and the lower part (region R), respectively, of the body part shown in FIG. 6A, and it is understood that no wrinkles have been generated in all of the upper part, middle part, and lower part.

Figure 7A:
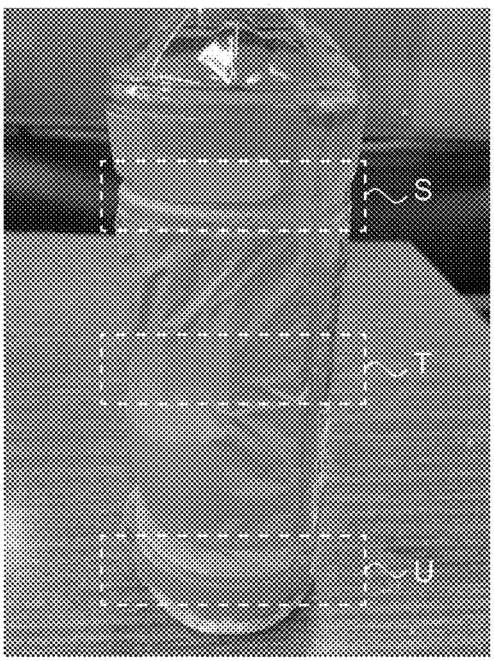
FIG. 7A is a diagram (photograph) showing the state of external appearance of a cylindrical-shaped label in a case where wrinkles have been generated, which corresponds to Comparative Example 1.
Figure 7B:
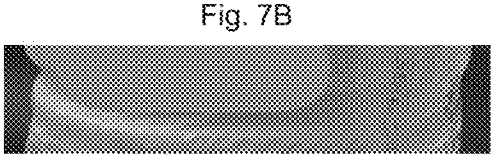
FIGS. 7B to 7D are enlarged views of regions S, T, and U, respectively, of the external appearance shown in FIG. 7A.
Figure 7C:
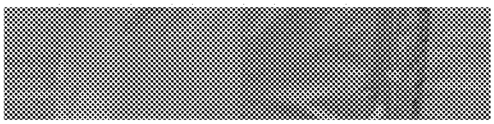
Figure 7D:
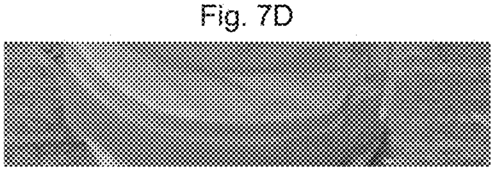

On the other hand, FIG. 7 is a photograph of the external appearance of a cylindrical-shaped label corresponding to Comparative Example 1 in a case where wrinkles have been generated, and FIG. 7A shows the entire body part of a PET bottle covered with this cylindrical-shaped label. FIGS. 7B to 7D are enlarged views of the upper part (region S), the middle part (region T), and the lower part (region U), respectively, of the body part shown in FIG. 7A, and it is understood that wrinkles have been generated in all of the upper part, middle part, and lower part.

Incidentally, in FIG. 6 and FIG. 7, filled areas in the diagrams are areas in which the contents printed on the label are completely filled, and the filled areas do not affect the evaluation of the wrinkle generation.

In addition to that, it has been separately found that even when the cylindrical-shaped label of FIG. 6 is used for a PET bottle having a complicated shape, in which the bottle diameter of the body part is uneven, and the horizontal cross-section shape of the body part is not a circular shape depending on the portion, wrinkles are not likely to be generated.

(2) Configuration (e)

Configuration (e) is a configuration requirement related to the thickness (average thickness) of the heat-shrinkable polyester film of the first embodiment, and usually, it is considered as a suitable embodiment that the thickness is set to a value within the range of 15 to 45 μm.

The reason for this is that by specifically limiting the thickness t to a value within a predetermined range in this manner, the thermal shrinkage ratio A2, numerical values represented by B, B/A2, and B/t, and the like are set to values within predetermined ranges, respectively, and are likely to be controlled more easily. Therefore, contributors of predetermined influential factors are reduced so that in the heat-shrinkable polyester film at the time of thermal shrinkage, non-uniform shrinkage caused by a rapid thermal response can be suppressed, and as a result, the generation of fine wrinkles can also be suppressed.

More specifically, it is because when the thickness represented by t is below 15 μm or above 45 in the heat-shrinkable polyester film at the time of thermal shrinkage, non-uniform shrinkage caused by a rapid thermal response may not be suppressed, and the generation of fine wrinkles may not be suppressed.

Therefore, as the configuration (e), it is more preferable to set the thickness represented by t to a value within the range of 20 to 43 and even more preferably to a value within the range of 25 to 40 μm.

(3) Configuration (f)

Configuration (f) is a configuration requirement related to the thermal shrinkage ratio A1 in a case where the heat-shrinkable polyester film is caused to shrink under the conditions of 10 seconds in hot water at 80 °C, and it is considered as a suitable embodiment that the thermal shrinkage ratio A1 is set to a value within the range of 40% to 70%.

The reason for this is that by specifically limiting the 80 °C thermal shrinkage ratio A1 to a value within a predetermined range in this manner, the 90 °C thermal shrinkage ratio A2 is likely to be controlled more easily to a value within a predetermined range.

More specifically, it is because when such 80 °C thermal shrinkage ratio A1 is below 40% or above 70%, the 90 °C thermal shrinkage ratio A2 would not be controlled to a value within a predetermined range, and the generation of wrinkles would not be suppressed.

Therefore, as the configuration (f), it is more preferable that the 80 °C thermal shrinkage ratio A1 to a value within the range of 42% to 68%, and even more preferably to a value within the range of 45% to 65%.

(4) Configuration (g)

Configuration (g) is a configuration requirement related to a thermal shrinkage ratio A'1 obtainable when a direction orthogonally intersecting the TD direction of the heat-shrinkable polyester film is designated as MD direction, and the heat-shrinkable polyester film is caused to shrink in this MD direction under the conditions of 10 seconds in hot water at 80 °C , and it is considered as a suitable embodiment that the thermal shrinkage ratio A'1 is set to a value of 10% or less.

The reason for this is that by specifically limiting the 80 °C thermal shrinkage ratio A'1 to be equal to or less than a predetermined ratio in this manner, the 90 °C thermal shrinkage ratio A'2 that will be described below is likely to be controlled more easily to a value within a predetermined range.

More specifically, it is because when such 80 °C thermal shrinkage ratio A'1 has a value of above 10%, the 90 °C thermal shrinkage ratio A'2 may not be controlled to a value within a predetermined range, and the generation of wrinkles may not be suppressed at the time of thermal shrinkage of the film.

Therefore, as the configuration (g), it is more preferable to set the 80 °C thermal shrinkage ratio A'1 to a value within the range of 1% to 9%, and even more preferably to a value of 2% to 8% or less.

(5) Configuration (h)

Configuration (h) is a configuration requirement related to a thermal shrinkage ratio A'2 obtainable when a direction orthogonally intersecting the TD direction of the heat-shrinkable polyester film is designated as MD direction, and the heat-shrinkable polyester film is caused to shrink in this MD direction under the conditions of 10 seconds in hot water at 90 °C, and it is considered as a suitable embodiment that the thermal shrinkage ratio A'2 is set to a value within the range of 1.5% to 15%.

The reason for this is that by specifically limiting the 90 °C thermal shrinkage ratio A'2 to a value within a predetermined range in this manner, the influential factors for the numerical values represented by B/A2 and B/t can be reduced, and at the time of thermal shrinkage of the film, the wrinkle resistance characteristics can be further improved.

More specifically, it is because when such 90 °C thermal shrinkage ratio A'2 is below 1.5% or above 15%, the influential factors for the numerical values represented by B/A2 and B/t may not be reduced, and at the time of thermal shrinkage of the film, satisfactory wrinkle resistance characteristics may not be obtained.

Therefore, as the configuration (h), it is more preferable to set the 90 °C thermal shrinkage ratio A'2 to a value within the range of 3% to 12%, and even more preferably to a value within the range of 4% to 11%.

(6) Configuration (i)

Configuration (i) is a configuration requirement related to a stretch ratio in the MD direction (average MD direction stretch ratio, may be simply referred to as MD direction stretch ratio) of the heat-shrinkable polyester film before shrinkage.

It is considered as a suitable embodiment that such MD direction stretch ratio is set to a value within the range of 100% to 200%.

The reason for this is that by specifically limiting the MD direction stretch ratio to a value within a predetermined range in this manner, and specifically limiting the numerical values represented by A1, A2, A'1, A'2, B, B/A2, and B/t, and the like to values within predetermined ranges, respectively, the generation of fine wrinkles can be suppressed.

More specifically, it is because when the MD direction stretch ratio is set to a value of below 100%, the product yield upon production may be notably decreased.

On the other hand, it is because when the MD direction stretch ratio is above 200%, the shrinkage ratio in the TD direction may be affected, and adjustment of the shrinkage ratio itself may be difficult.

Therefore, as the configuration (i), it is more preferable to set the MD direction stretch ratio to a value within the range of 110% to 180%, and even more preferably to a value within the range of 120% to 160%.

(7) Configuration (j)

Furthermore, configuration (j) is a configuration requirement related to a stretch ratio in the TD direction (average TD direction stretch ratio, may be simply referred to as TD direction stretch ratio) of the heat-shrinkable polyester film before thermal shrinkage.

It is considered as a suitable embodiment that such TD direction stretch ratio is set to a value within the range of 300% to 600%.

The reason for this is that by specifically limiting the TD direction stretch ratio to a value within a predetermined range in this manner, and specifically limiting the numerical values represented by A1, A2, A'1, A'2, B, B/A2, and B/t, and the like to values within predetermined ranges, respectively, the generation of fine wrinkles can also be suppressed.

More specifically, it is because when the TD direction stretch ratio is set to a value of below 300%, the shrinkage ratio in the TD direction may be notably decreased, and the use application of a usable heat-shrinkable polyester film may be excessively limited.

On the other hand, it is because when the TD direction stretch ratio is set to a value of above 600%, the shrinkage ratio may be markedly increased, and the use application of a usable heat-shrinkable polyester film may be excessively limited, or it may be difficult to control the stretch ratio itself to be constant.

Therefore, as the configuration (j), it is more preferable to set the TD direction stretch ratio to a value within the range of 350% to 550%, and even more preferably to a value within the range of 400% to 500%.

(8) Configuration (k)

Furthermore, configuration (k) is an optional configuration requirement to the effect that a haze value of the heat-shrinkable polyester film before thermal shrinkage as measured according to JIS K 7105 is set to a value of 5% or less.

The reason for this is that by specifically limiting the haze value to a value within a predetermined range in this manner, even the transparency of the heat-shrinkable polyester film can be controlled easily and quantitatively, and as transparency is satisfactory, general-purpose usability can be further enhanced.

More specifically, it is because when the haze value of the film before thermal shrinkage is set to a value of above 5%, transparency may be decreased, and it may be difficult to apply the film to decorative applications for PET bottles, or the like.

On the other hand, it is because when the haze value of the film before thermal shrinkage is excessively small, it may be difficult to stably control the haze value, and the product yield upon production may be notably decreased.

Therefore, as the configuration (k), it is more preferable to set the haze value of the film before thermal shrinkage to a value within the range of 0.1% to 3%, and even more preferably to a value within the range of 0.5% to 1%.

(9) Configuration (m)

Furthermore, configuration (m) is an optional configuration requirement to the effect that the heat-shrinkable polyester film of the first embodiment includes a non-crystalline polyester resin in an amount within the range of 90% to 100% by weight of the total amount.

The reason for this is that by specifically limiting the content of the non-crystalline polyester resin in this manner, the thermal shrinkage ratio and maximum shrinkage stress in the vicinity of the shrinkage temperature can be made more easily adjustable to desired ranges, and at the same time, the haze value and the like are also likely to be controlled quantitatively.

More specifically, it is because when the content of the non-crystalline polyester resin is set to a value of below 90% by weight, control of the shrinkage ratio in the vicinity of the shrinkage temperature of the heat-shrinkable polyester film and the maximum shrinkage stress may be difficult.

Furthermore, when the content of the crystalline polyester resin becomes excessively large, there is a possibility that the scope of reducing the contributors of predetermined influential factors may become markedly narrow.

Therefore, as the configuration (m), it is more preferable to set the content of the crystalline polyester resin to a value within the range of 91% to 100% by weight, and even more preferably to a value within the range of 92% to 100% by weight, of the total quantity.

(10) Others

It is preferable that various additives are blended into or attached to the inner part of the heat-shrinkable polyester film of the first embodiment, or to one surface or both surfaces of the heat-shrinkable polyester film.

More specifically, it is preferable to blend at least one of a hydrolysis inhibitor, an antistatic agent, an ultraviolet absorber, an infrared absorber, a colorant, an organic filler, an inorganic filler, an organic fiber, an inorganic fiber, and the like, usually in an amount within the range of 0.01% to 10% by weight, and more preferably in the range of 0.1% to 1% by weight, with respect to the total amount of the heat-shrinkable polyester film.

Figure 1B:
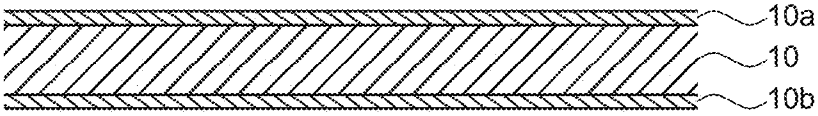

Furthermore, as shown in FIG. 1B, it is also preferable to laminate other resin layers 10*a* and 10*b* including at least one of these various additives on one surface or both surfaces of the heat-shrinkable polyester film 10.

In that case, when the thickness of the heat-shrinkable polyester film is taken as 100%, it is preferable that the single layer thickness or the total thickness of the other resin layers that are additionally laminated is usually set to a value within the range of 0.1% to 10%.

Then, it is preferable that the resin as a main component constituting the other resin layers may be the same polyester resin as the heat-shrinkable polyester film or is at least one of an acrylic resin different from that, an olefin resin, a urethane resin, a rubber material, and the like.

Figure 1C:
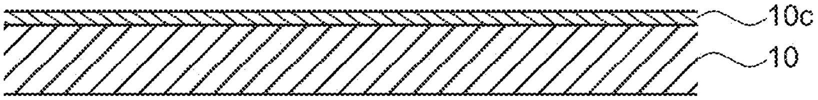

In addition, it is also preferable that a hydrolysis preventing effect and mechanical protection is further promoted by adopting a multilayer structure for the heat-shrinkable polyester film, or as shown in FIG. 1C, a shrinkage ratio adjusting layer 10*c* is provided on the surface of the heat-shrinkable polyester film 10 so that the shrinkage ratio of the heat-shrinkable polyester film becomes uniform in the plane.

Such a shrinkage ratio adjusting layer can be laminated by using an adhesive, a coating method, a heating treatment, or the like, according to the shrinkage characteristics of the heat-shrinkable polyester film.

More specifically, the thickness of the shrinkage ratio adjusting layer is within the range of 0.1 to 3 μm, and when the shrinkage ratio of the heat-shrinkable polyester film at a predetermined temperature is excessively large, it is preferable to laminate a shrinkage ratio adjusting layer of a type that suppresses the shrinkage ratio.

In addition, when the shrinkage ratio of the heat-shrinkable polyester film at a predetermined temperature is excessively small, it is preferable to laminate the shrinkage ratio adjusting layer of a type that enlarges the shrinkage ratio.

Therefore, it is intended to obtain a desired shrinkage ratio by means of the shrinkage ratio adjusting layer without producing various shrink films having different shrinkage ratios as the heat-shrinkable polyester film.

Second Embodiment

A second embodiment is an embodiment relating to a method for producing the heat-shrinkable polyester film of the first embodiment.

1. Step of Preparing and Mixing Raw Materials

First, it is preferable that main agents and additives, such as a crystalline polyester resin, a non-crystalline polyester resin, a rubber material, an antistatic agent, and a hydrolysis inhibitor, are prepared as raw materials.

Next, it is preferable that the prepared crystalline polyester resin, non-crystalline polyester resin, and the like are introduced into a stirring vessel while weighing the resins, and the mixture is mixed and stirred using a stirring device until the mixture becomes uniform.

2. Step of Producing Raw Sheet

Next, it is preferable that the uniformly mixed raw materials are dried into an absolute dry state.

Next, it is preferable that extrusion molding is typically performed, and a raw sheet having a predetermined thickness is produced.

More specifically, extrusion molding is performed, for example, under the conditions of an extrusion temperature of 180 °C by using an extruder (manufactured by TANABE PLASTICS MACHINERY CO., LTD.) with L/D24 and an extruding screw diameter of 50 mm, and a raw sheet having a predetermined thickness (usually, 10 to 100 μm) can be obtained.

3. Production of Heat-Shrinkable Polyester Film

Next, the obtained raw sheet is heated and pressed, while being moved on rolls or between rolls by using a shrink film production apparatus, to produce a heat-shrinkable polyester film.

That is, it is preferable that the polyester molecules constituting the heat-shrinkable polyester film are crystallized into a predetermined shape by stretching the heat-shrinkable polyester film in a predetermined direction while basically expanding the film width at a predetermined stretching temperature and a predetermined stretch ratio and while heating and pressing the film.

Then, by solidifying the heat-shrinkable polyester film in that state, a thermally shrinkable heat-shrinkable polyester film that is used for decorations, labels, and the like can be produced.

4. Step of Inspecting Heat-Shrinkable Polyester Film

It is preferable that the following characteristics and the like are measured continuously or intermittently for the produced heat-shrinkable polyester film, and a predetermined inspection step is provided.

That is, by measuring the following characteristics and the like through a predetermined inspection step and checking whether the characteristics fall in the values within predetermined ranges, a heat-shrinkable polyester film having more uniform shrinkage characteristics and the like can be obtained.

1) Visual inspection of external appearance of heat-shrinkable polyester film
2) Measurement of variation in thickness
3) Measurement of tensile modulus
4) Measurement of tear strength
5) Measurement of viscoelasticity characteristics based on SS curve Then, for the production of the heat-shrinkable polyester film of the second embodiment, it is essential to measure, calculate and restrict the following (a) to (c) in the specific range.

(a) Thermal shrinkage ratio A2 obtainable when the main shrinkage direction is designated as TD direction, and the heat-shrinkable polyester film is caused to shrink in the TD direction under the conditions of 10 seconds in hot water at 90 °C
(b) Maximum shrinkage stress B in the TD direction obtainable under the conditions of 30 seconds or longer in hot air at 90 °C.
(c) Numerical value represented by B/A2

Third Embodiment

A third embodiment is an embodiment relating to a method of using a heat-shrinkable polyester film.

Therefore, that is, any known method of using a shrink film can be suitably applied.

For example, on the occasion of carrying out a method of using a heat-shrinkable polyester film, first, the heat-shrinkable polyester film is cut into an appropriate length or width, and at the same time, a long cylindrical object is formed.

Next, this long cylindrical object is supplied to an automatic label mounting apparatus (shrink labeler) and is cut into a necessary length.

Next, the long cylindrical object is externally fitted to a PET bottle or the like filled with contents.

Next, as a heating treatment for the heat-shrinkable polyester film externally fitted to a PET bottle or the like, the heat-shrinkable polyester film is passed through the interior of a hot air tunnel or a steam tunnel at a predetermined temperature.

Then, the heat-shrinkable polyester film is uniformly heated to thermally shrink the film by emitting radiant heat such as infrared radiation provided in these tunnels or blowing heated steam at about 90 °C from the surroundings.

Therefore, the heat-shrinkable polyester film is adhered closely to the outer surface of the PET bottle or the like, and thereby a labeled container can be quickly obtained.

Here, according to the heat-shrinkable polyester film of the present invention, at least configurations (a) to (c) are satisfied.

By doing so, a satisfactory thermal shrinkage ratio and a satisfactory maximum shrinkage stress for the heat-shrinkable polyester film at the time of heat shrinkage, can be obtained.

Furthermore, by controlling the maximum shrinkage stress to a value within a predetermined range, a heat-shrinkable polyester film capable of suppressing wrinkles that can be generated as a result of excess or deficiency of the maximum shrinkage stress, can be obtained.

In addition, even in a case where the values of the thermal shrinkage ratio and the maximum shrinkage stress vary to some extent, contributors of predetermined influential factors are reduced so that for the heat-shrinkable polyester film at the time of thermal shrinkage, non-uniform shrinkage caused by a rapid thermal response can be suppressed, and as a result, the generation of fine wrinkles can also be suppressed.

Therefore, as shown in FIGS. 6A to 6D, even when a label produced from this film is put on the body part of a bottle and is caused to thermally shrink, the label can be fitted so as to follow the shape of the bottle periphery, and the generation of fine wrinkles can also be suppressed.

On the other hand, when at least the configurations (a) to (c) are not satisfied, as shown in FIGS. 7A to 7D, regions in which the label is incapable of following the shape of the bottle periphery occur from the upper part to the lower part of the bottle body part, and the generation of wrinkles is also significantly observed.

Incidentally, since the heat-shrinkable polyester film of the present invention practically does not include a structural unit derived from lactic acid, there is an advantage that strict humidity management in the storage conditions and the like are unnecessary.

EXAMPLES

Hereinafter, the present invention will be described in detail based on Examples. However, the scope of rights of the present invention shall not be narrowed by the description of Examples without any particular reason.

Incidentally, the resins used in the Examples are as follows.

(PETG1)

Non-crystalline polyester composed of dicarboxylic acid: 100 mol % of terephthalic acid, and diol: 70 mol % of ethylene glycol, 25 mol % of 1,4-cyclohexanedimethanol, and 5 mol % of diethylene glycol (PETG2)

Non-crystalline polyester composed of dicarboxylic acid: 100 mol % of terephthalic acid, and diol: 72 mol % of ethylene glycol, 25 mol % of neopentyl glycol, and 3 mol % of diethylene glycol (APET)

Crystalline polyester composed of dicarboxylic acid: 100 mol % of terephthalic acid and diol: 100 mol % of ethylene glycol (PBT)

Crystalline polyester composed of dicarboxylic acid: 100 mol % of terephthalic acid and diol: 100 mol % of 1,4-butanediol

Example 1

1. Production of Heat-Shrinkable Polyester Film 100 parts by weight (pbw) of a non-crystalline polyester resin (PETG1) was used in a stirring vessel.

Next, this raw material was brought into an absolute dry state, and then extrusion molding was performed under the conditions of an extrusion temperature of 180° C. by using an extruder (manufactured by TANABE PLASTICS MACHINERY CO., LTD.) with L/D24 and an extruding screw diameter of 50 mm to obtain a raw sheet having a thickness of 100 μm.

Next, a heat-shrinkable polyester film having a thickness of 40 μm was produced from the raw sheet by using a shrink film production apparatus, at a stretching temperature of 83° C. and a stretch ratio (MD direction: 105%, TD direction: 480%).

2. Evaluation of Heat-Shrinkable Polyester Film (1) Evaluation 1: Variation in Thickness The thickness (taking the desired value 40 μm as a reference value) of the obtained heat-shrinkable polyester film was measured by using a micrometer and evaluated according to the following criteria as Eva 1.

- ⊙ (Very good): The variation in thickness has a value within the range of (reference value±0.1 μm).
- ○ (Good): The variation in thickness has a value within the range of (reference value±0.5 μm).
- Δ (Fair): The variation in thickness has a value within the range of (reference value±1.0 μm).
- × (Bad): The variation in thickness has a value within the range of (reference value±3.0 μm).

(2) Evaluation 2: Thermal Shrinkage Ratio 1 (A1)

The obtained heat-shrinkable polyester film (TD direction) was immersed in hot water at 80 °C for 10 seconds (condition A1) by using a constant temperature tank, and the film was caused to thermally shrink.

Next, the thermal shrinkage ratio (A1) was calculated according to the following formula from the dimensional changes before and after the heating treatment at a predetermined temperature (80 °C hot water), and the thermal shrinkage ratio (A1) was evaluated according to the following criteria as Eva 2.

Thermal shrinkage ratio=(Length of film before thermal shrinkage−length of film after thermal shrinkage)/length of film before thermal shrinkage×100

- ⊙ (Very good): Thermal shrinkage ratio (A1) has a value within the range of 45% to 65%.
- ○ (Good): Thermal shrinkage ratio (A1) has a value within the range of 40% to 70% and is outside the above-described range of ⊙.
- Δ (Fair): Thermal shrinkage ratio (A1) has a value within the range of 35% to 75% and is outside the above-described range of ○.
- × (Bad): Thermal shrinkage ratio (A1) has a value of below 35% or above 75%.

(3) Evaluation 3: Thermal Shrinkage Ratio 2 (A2)

The obtained heat-shrinkable polyester film (TD direction) was immersed in hot water at 90 °C for 10 seconds (condition A2) by using a constant temperature tank, and the film was caused to thermally shrink.

Next, the thermal shrinkage ratio (A2) was calculated according to the following formula from the dimensional changes before and after the heating treatment at a predetermined temperature (at 90 °C hot water), and the thermal shrinkage ratio (A2) was evaluated according to the following criteria as Eva 3.

Thermal shrinkage ratio=(Length of film before thermal shrinkage−length of film after thermal shrinkage)/length of film before thermal shrinkage×100

⊙ (Very good): Thermal shrinkage ratio (A2) has a value within the range of 56% to 80%.

○ (Good): Thermal shrinkage ratio (A2) has a value within the range of 53% to 85% and is outside the above-described range of ⊙.

Δ (Fair): Thermal shrinkage ratio (A2) has a value within the range of 50% to 90% and is outside the above-described range of ○.

× (Bad): Thermal shrinkage ratio (A2) has a value of below 50% or above 90%.

(4) Evaluation 4: Thermal Shrinkage Ratio 3 (A'1)

The obtained heat-shrinkable polyester film (MD direction) was immersed in hot water at 80 °C for 10 seconds (condition A'1) by using a constant temperature tank, and the film was caused to thermally shrink.

Next, the thermal shrinkage ratio (A'1) was calculated according to the following formula from the dimensional changes before and after the heating treatment at a predetermined temperature (80 °C hot water), and the thermal shrinkage ratio (A'1) was evaluated according to the following criteria as Eva 4.

Thermal shrinkage ratio=(Length of film before thermal shrinkage−length of film after thermal shrinkage)/length of film before thermal shrinkage×100

⊙ (Very good): Thermal shrinkage ratio (A'1) has a value of 8% or less.

○ (Good): Thermal shrinkage ratio (A'1) has a value of 10% or less.

Δ (Fair): Thermal shrinkage ratio (A'1) has a value of 12% or less.

× (Bad): Thermal shrinkage ratio (A'1) has a value of above 12%.

(5) Evaluation 5: Thermal Shrinkage Ratio 4 (A'2)

The obtained heat-shrinkable polyester film (MD direction) was immersed in hot water at 90 °C for 10 seconds (condition A'2) by using a constant temperature tank, and the film was caused to thermally shrink.

Next, the thermal shrinkage ratio (A'2) was calculated according to the following formula from the dimensional changes before and after the heating treatment at a predetermined temperature (at 90 °C hot water), and the thermal shrinkage ratio (A'2) was evaluated according to the following criteria as Eva 5.

Thermal shrinkage ratio=(Length of film before thermal shrinkage−length of film after thermal shrinkage)/length of film before thermal shrinkage×100

⊙ (Very good): Thermal shrinkage ratio (A'2) has a value within the range of 2% to 12%.

○ (Good): Thermal shrinkage ratio (A'2) has a value within the range of 1.5% to 15% and is outside the above-described range of ⊙.

Δ (Fair): Thermal shrinkage ratio (A'2) has a value within the range of 1% to 18% and is outside the above-described range of ○.

× (Bad): Thermal shrinkage ratio (A'2) has a value of below 1% or above 18%.

(6) Evaluation 6: Maximum Shrinkage Stress 1 (B)

The obtained heat-shrinkable polyester film was cut into a strip shape having a width of 25.4 mm in the MD direction and a length of 75 mm in the TD direction, and this was prepared as a test specimen.

Next, the shrinkage stress of the prepared test specimen was measured by using a strength and elongation measuring machine equipped with a heating furnace.

More specifically, the heating furnace was heated in advance to 90 °C, air blowing into the heating furnace was temporarily stopped, the door of the heating furnace was opened, the test specimen was attached to the chucks of the strength and elongation measuring machine, subsequently the door of the heating furnace was quickly closed, and air blowing was restarted.

Next, the shrinkage stress was measured for 30 seconds or longer, and the maximum value during the measurement was evaluated according to the following criteria as Eva 6 based on the maximum shrinkage stress B.

Figure 8:
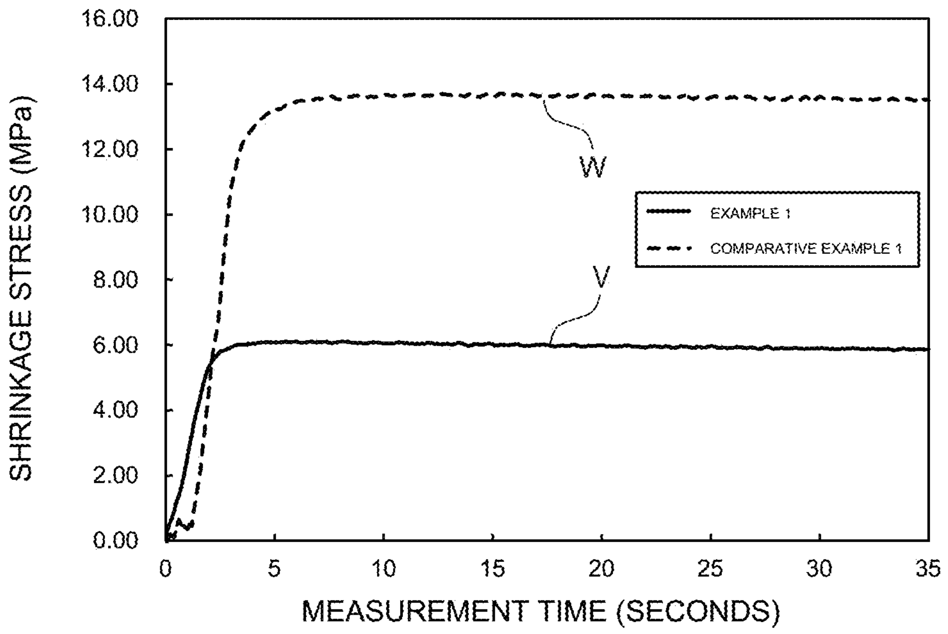
FIG. 8 is a diagram showing changes over time in the shrinkage stress of the heat-shrinkable polyester film under predetermined heating conditions (hot air at 90 °C, for 30 seconds or longer).

Incidentally, the changes over time in the measured shrinkage stress were as shown in a characteristic curve V shown in FIG. 8.

More specifically, the shrinkage stress became the maximum after 6.6 seconds from the initiation of measurement, and the value was 6.13 MPa.

⊙ (Very good): The value is within the range of 3 to 9 MPa.

○ (Good): The value is within the range of 2 to 10 MPa and is outside the above-described range of ⊙.

Δ (Fair): The value is within the range of 1 to 11 MPa and is outside the above-described range of ○.

× (Bad): The value is below 1 MPa or above 11 MPa.

(7) Evaluation 7: Maximum shrinkage stress 2 (B/A2)

From the maximum shrinkage stress B and the thermal shrinkage ratio A2 of the obtained heat-shrinkable polyester film, B/A2 (MPa/%) was calculated and evaluated according to the following criteria as Eva 7.

⊙ (Very good): The value is within the range of 0.09 to 0.14 MPa/%.

○ (Good): The value is within the range of 0.08 to 0.15 MPa/% and is outside the above-described range of ⊙.

Δ (Fair): The value is within the range of 0.07 to 0.16 MPa/% and is outside the above-described range of ○.

× (Bad): The value is below 0.07 MPa/% or above 0.16 MPa/%.

(8) Evaluation 8: Maximum Shrinkage Stress 3 (B/t)

From the maximum shrinkage stress B and the film thickness t of the obtained heat-shrinkable polyester film, B/t (MPa/μm) was calculated and evaluated according to the following criteria as Eva 8.

⊙ (Very good): The value is within the range of 0.06 to 0.35 MPa/μm.

○ (Good): The value is within the range of 0.05 to 0.4 MPa/μm and is outside the above-described range of ⊙.

Δ (Fair): The value is within the range of 0.04 to 0.45 MPa/μm and is outside the above-described range of ○.

× (Bad): The value is below 0.04 MPa/μm or above 0.45 MPa/μm.

(9) Evaluation 9: Wrinkle Resistance Characteristics

A column-shaped PET bottle (volume: 500 ml) in a state of being filled with a commercially available beverage was prepared.

Next, a long shrink film obtained by slitting the heat-shrinkable polyester film into a width of 26 cm was provided with perforations having a width of 1 mm along the longitudinal direction, and 1,3-dioxolane was applied on the end parts in the width direction.

Next, the end parts in the width direction were superposed and adhered such that the overlap margin became about 1 cm, and a cylindrical-shaped label having a diameter of about 8 cm was obtained. Furthermore, this cylindrical-shaped label was cut out at an interval of 16 cm in the longitudinal direction, and a plurality of cylindrical-shaped labels were obtained.

Next, the cylindrical-shaped label was put on the body part of the prepared column-shaped PET bottle, the PET bottle was placed on a belt conveyor and moved at a passing speed of 6 m/min inside a steam tunnel maintained at 85 °C, and the cylindrical-shaped label was caused to thermally shrink so as to closely adhere to the body part of the column-shaped PET bottle from the upper part to the lower part.

Next, the cylindrical-shaped label after thermal shrinkage was observed by visual inspection, and the wrinkle resistance characteristics were evaluated according to the following criteria as Eva 9 by checking whether wrinkles having a predetermined length (1 cm or more) and a predetermined width (1 mm or more) were not generated.

⊙ (Very good): Generation of predetermined wrinkles was not observed in all five out of five cylindrical-shaped labels.

○ (Good): Generation of predetermined wrinkles was not observed in three or more out of five cylindrical-shaped labels.

Δ (Fair): Generation of predetermined wrinkles was not observed in one or more out of five cylindrical-shaped labels.

× (Bad): Generation of predetermined wrinkles was observed in all five out of five cylindrical-shaped labels.

(10) Evaluation 10: Haze Value

The haze value of the obtained heat-shrinkable polyester film was measured according to JIS K 7105, and the haze value was evaluated according to the following criteria as Eva 10.

⊙ (Very good): The value is 1% or less.

○ (Good): The value is 3% or less.

Δ (Fair): The value is 5% or less.

× (Bad): The value is above 5%.

Examples 2 to 5

In Examples 2 to 5, the maximum shrinkage stress 1 (B), the maximum shrinkage stress 2 (B/A2), and the like were evaluated in the same manner as in Example 1, except that the respective values of the configurations (a) to (c) and the like were changed as indicated in Table 1, and various heat-shrinkable polyester films were produced in the same manner as in Example 1. The results are presented in Table 2.

That is, in Example 2, evaluation was performed in the same manner as in Example 1, except that a heat-shrinkable polyester film having a thickness of 25 μm was produced by using a non-crystalline polyester resin (PETG1) as a raw material and changing the extrusion conditions. The results are shown in Table 2.

Furthermore, in Example 3, evaluation was performed in the same manner as in Example 1, except that a heat-shrinkable polyester film having a thickness of 40 μm was produced by using a non-crystalline polyester resin (PETG1) as a raw material and changing the extrusion conditions.

Furthermore, in Example 4, evaluation was performed in the same manner as in Example 1, except that a heat-shrinkable polyester film having a thickness of 25 μm was produced by mixing 90 parts by weight of a non-crystalline polyester resin (PETG1) and 10 parts by weight of a crystalline polyester resin (PBT) at these proportions, using the mixture as a raw material, and changing the extrusion conditions.

Furthermore, in Example 5, evaluation was performed in the same manner as in Example 1, except that a heat-shrinkable polyester film having a thickness of 39 μm was produced by using a non-crystalline polyester resin (PETG2) as a raw material and changing the extrusion conditions.

Comparative Example 1

In Comparative Example 1, a heat-shrinkable polyester film that did not satisfy the configuration requirements (b) and (c) was produced as shown in Table 1, the heat-shrinkable polyester film was evaluated in the same manner as in Example 1, and the results are summarized in Table 2.

That is, a heat-shrinkable polyester film having a thickness of 30 μm that did not satisfy the configuration requirements (b) and (c) was produced by mixing 90 parts by weight of a non-crystalline polyester resin (PETG1) and 10 parts by weight of a crystalline polyester resin (APET) at these proportions, using the mixture as a raw material, and changing the extrusion conditions.

Incidentally, the changes over time in the measured shrinkage stress were as shown by a characteristic curve W shown in FIG. 8.

More specifically, the shrinkage stress became the maximum after 14 seconds from the initiation of measurement, and the value was 13.74 MPa.

Comparative Example 2

In Comparative Example 2, a heat-shrinkable polyester film that did not satisfy the configuration requirements (a) to (c) was produced as shown in Table 1, the heat-shrinkable polyester film was produced and evaluated in the same manner as in Example 1, and the results are summarized in Table 2.

That is, a heat-shrinkable polyester film having a thickness of 22 μm that did not satisfy the configuration requirements (a) to (c) was produced by using only a non-crystalline polyester resin (PETG2) as a raw material and changing the extrusion conditions.

TABLE 1

| | PETG 1 (pbw) | PETG 2 (pbw) | APET (pbw) | PBT (pbw) | Stretching temperature (° C.) | Thermal fixing temperature (° C.) | MD stretch ratio (%) | TD stretch ratio (%) | Thickness t (μm) |
|---|---|---|---|---|---|---|---|---|---|
| Example 1 | 100 | | | | 83 | 81 | 105 | 480 | 40 |
| Example 2 | 100 | | | | 86 | 85 | 111 | 500 | 25 |
| Example 3 | 100 | | | | 76 | 73 | 105 | 460 | 40 |
| Example 4 | 90 | | | 10 | 81 | 80 | 125 | 480 | 25 |

TABLE 1-continued

| | PETG 1 (pbw) | PETG 2 (pbw) | APET (pbw) | PBT (pbw) | Stretching temperature (° C.) | Thermal fixing temperature (° C.) | MD stretch ratio (%) | TD stretch ratio (%) | Thickness t (μm) |
|---|---|---|---|---|---|---|---|---|---|
| Example 5 | | 100 | | | 80 | 75 | 105 | 480 | 39 |
| Comparative Example 1 | 90 | | 10 | | 83 | 82 | 100 | 500 | 30 |
| Comparative Example 2 | | 100 | | | 90 | 85 | 180 | 350 | 22 |

TABLE 2

| | Configuration | | | | | | | | | | | | | | | | |
|---|---|---|---|---|---|---|---|---|---|---|---|---|---|---|---|---|---|
| | (a) A2 (%) | (b) B (MPa) | (c) B/A2 (MPa/%) | (d) B/t (Mpa/μm) | (f) A1 (%) | (g) A'1 (%) | (h) A'2 (%) | Eva 1 | Eva 2 | Eva 3 | Eva 4 | Eva 5 | Eva 6 | Eva 7 | Eva 8 | Eva 9 | Eva 10 |
| Example 1 | 59.3 | 6.13 | 0.10 | 0.15 | 50.7 | 0.0 | 1.7 | ⊙ | ⊙ | ⊙ | ⊙ | ○ | ⊙ | ⊙ | ⊙ | ⊙ | ⊙ |
| Example 2 | 54.5 | 6.45 | 0.12 | 0.26 | 45.0 | 4.5 | 7.5 | ⊙ | ⊙ | ○ | ⊙ | ⊙ | ⊙ | ⊙ | ⊙ | ⊙ | ⊙ |
| Example 3 | 77.7 | 9.62 | 0.12 | 0.24 | 69.0 | 0.3 | 2.7 | ⊙ | ○ | ⊙ | ⊙ | ⊙ | ○ | ⊙ | ⊙ | ⊙ | ⊙ |
| Example 4 | 59.0 | 7.83 | 0.13 | 0.31 | 50.0 | 9.7 | 13.0 | ⊙ | ⊙ | ⊙ | ○ | ○ | ⊙ | ⊙ | ⊙ | ⊙ | ⊙ |
| Example 5 | 70.0 | 7.32 | 0.10 | 0.19 | 62.0 | 4.0 | 5.0 | ⊙ | ⊙ | ⊙ | ⊙ | ⊙ | ⊙ | ⊙ | ⊙ | ⊙ | ⊙ |
| Comparative Example 1 | 55.5 | 13.74 | 0.25 | 0.46 | 47.3 | 3.0 | 4.1 | ⊙ | ⊙ | ○ | ⊙ | ⊙ | X | X | X | X | ⊙ |
| Comparative Example 2 | 52.0 | 10.13 | 0.19 | 0.46 | 38.5 | 6.0 | 9.5 | ⊙ | Δ | Δ | ⊙ | ⊙ | Δ | X | X | X | ⊙ |

*Eva 1: Variation in thickness
*Eva 2 to 5: Thermal shrinkage ratios 1 to 4
*Eva 6 to 8: Maximum shrinkage stress 1 to 3
*Eva 9: Wrinkle resistance characteristics
*Eva 10: Haze value

INDUSTRIAL APPLICABILITY

According to the present invention, disadvantages of conventional thermally shrinkable thermoplastic resin films, particularly heat-shrinkable polyester films were eliminated, and by limiting at least the thermal shrinkage ratio A2, the maximum shrinkage stress B, and B/A2 to values within predetermined ranges, a heat-shrinkable polyester film or the like having excellent wrinkle resistance characteristics can now be effectively provided.

Therefore, it can be said that according to the heat-shrinkable polyester film of the present invention, the film can be applied to various PET bottles and the like, general-purpose usability can be markedly increased, and the industrial applicability thereof is extremely high.

The invention claimed is:

1. A heat-shrinkable polyester film derived from a polyester resin, the polyester resin including a non-crystalline polyester in an amount within the range of 90% to 100% by weight of a total quantity of the polyester resin, the heat-shrinkable polyester film having:

a haze value of 5% or less before shrinkage as measured according to JIS K7105; and a stretch ratio within the range of 100% to 200% in a MD direction of the film before shrinkage, where a main shrinkage direction is designated as a TD direction and a direction orthogonally intersecting the TD direction is designated as the MD direction;

the film satisfying the following configurations (a) to (d):

(a) a thermal shrinkage ratio in the TD direction obtainable in a case where the heat-shrinkable polyester film is caused to shrink under the conditions of 10 seconds in hot water at 90 °C is designated as A2, and the A2 is set to a value of 53% or greater;

(b) a maximum shrinkage stress in the TD direction at a shrinkage temperature of 90 °C is designated as B, and the B is set to a value within the range of 2 to 10 MPa;

(c) a numerical value represented by B/A2 is set to a value within the range of 0.08 to 0.15 MPa/%; and (d) a thermal shrinkage ratio in the TD direction obtainable when the heat-shrinkable polyester film is caused to shrink in hot water at 80 °C under the conditions of 10 seconds is designated as A1, and the A1 is set to a value within the range of 45% to 70%.

2. The heat-shrinkable polyester film according to claim 1, wherein the heat-shrinkable polyester film further satisfies the following configuration (e):

(e) a thickness of the heat-shrinkable polyester film before shrinkage is designated as t, and a numerical value represented by B/t is set to a value within the range of 0.05 to 0.40 MPa/μm.

3. The heat-shrinkable polyester film according to claim 1, wherein the thickness t of the heat-shrinkable polyester film before shrinkage is set to a value within the range of 15 to 45 μm.

4. The heat-shrinkable polyester film according to claim 1, wherein a stretch ratio in the TD direction of the heat-shrinkable polyester film before shrinkage is set to a value within the range of 300% to 600%.

5. A heat-shrinkable polyester film derived from a polyester resin, the polyester resin including a non-crystalline polyester in an amount within the range of 90% to 100% by weight of a total quantity of the resin, where the non-crystalline polyester is formed from a diol as a compound component comprising ethylene glycol, diethylene glycol, and 1,4-cyclohexanedimethanol, the film satisfying the following configurations (a) to (d):

(a) when a main shrinkage direction is designated as TD direction, a thermal shrinkage ratio in the TD direction obtainable in a case where the heat-shrinkable polyester film is caused to shrink under the conditions of 10 seconds in hot water at 90 °C is designated as A2, and the A2 is set to a value of 53% or greater;

(b) a maximum shrinkage stress in the TD direction at a shrinkage temperature of 90 °C is designated as B, and the B is set to a value within the range of 2 to 10 MPa;

(c) a numerical value represented by B/A2 is set to a value within the range of 0.08 to 0.15 MPa/%; and (d) a thermal shrinkage ratio in the TD direction obtainable when the heat-shrinkable polyester film is caused to shrink in hot water at 80 °C under the conditions of 10 seconds is designated as A1, and the A1 is set to a value within the range of 45% to 70%.

6. The heat-shrinkable polyester film according to claim 5, wherein a haze value of the heat-shrinkable polyester film before shrinkage as measured according to JIS K7105 is set to a value of 5% or less.

7. A heat-shrinkable polyester film derived from a polyester resin, the polyester resin including a non-crystalline polyester in an amount within the range of 90% to 100% by weight of a total quantity of the resin, the heat-shrinkable polyester film having:

a haze value of 5% or less before shrinkage as measured according to JIS K7105;

the film satisfying the following configurations (a) to (d):

(a) when a main shrinkage direction is designated as a TD direction, a thermal shrinkage ratio in the TD direction obtainable in a case where the heat-shrinkable polyester film is caused to shrink under the conditions of 10 seconds in hot water at 90 °C is designated as A2, and the A2 is set to a value of 53% or greater;

(b) a maximum shrinkage stress in the TD direction at a shrinkage temperature of 90 °C is designated as B, and the B is set to a value within the range of 2 to 10 MPa;

(c) a numerical value represented by B/A2 is set to a value within the range of 0.08 to 0.15 MPa%;

(d) a thermal shrinkage ratio in a MD direction orthogonally intersecting the TD direction obtainable when the heat-shrinkable polyester film is caused to shrink under the conditions of 10 seconds in hot water at 80 °C is designated as A'1, and the A'1 is set to a value of 2 to 10%; and (e) a thermal shrinkage ratio in the TD direction obtainable when the heat-shrinkable polyester film is caused to shrink in hot water at 80 °C under the conditions of 10 seconds is designated as A1, and the A1 is set to a value within the range of 45% to 70%.

8. The heat-shrinkable polyester film according to claim 1, wherein the non-crystalline polyester is formed from a diol as a compound component comprising ethylene glycol, diethylene glycol, and 1,4-cyclohexanedimethanol, or the non-crystalline polyester is formed from a diol as a compound component comprising ethylene glycol, diethylene glycol, and neopentyl glycol.

9. The heat-shrinkable polyester film according to claim 7, wherein the non-crystalline polyester is formed from a diol as a compound component comprising ethylene glycol, diethylene glycol, and 1,4-cyclohexanedimethanol, or the non-crystalline polyester is formed from a diol as a compound component comprising ethylene glycol, diethylene glycol, and neopentyl glycol.

* * * * *